United States Patent
Agata et al.

(10) Patent No.: US 6,504,707 B2
(45) Date of Patent: Jan. 7, 2003

(54) PORTABLE COMPUTER

(75) Inventors: Hiroaki Agata, Yokohama (JP);
Kenshin Yonemochi, Kamakura (JP);
Takehiko Noguchi, Tokyo-to (JP);
Hisashi Shima, Yamato (JP); John Peter Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 09/853,295

(22) Filed: May 11, 2001

(65) Prior Publication Data

US 2001/0055197 A1 Dec. 27, 2001

(30) Foreign Application Priority Data

Jun. 14, 2000 (JP) .......................................... 2000-178932

(51) Int. Cl.[7] .............................. G06F 1/16; H05K 5/02
(52) U.S. Cl. ..................... 361/681; 361/679; 361/683; 361/686; 345/905; 312/223.2; 248/920; 248/919
(58) Field of Search ................................. 361/679–686; 348/794; 345/168, 169, 905; 312/223.2, 223.3; 248/917–923

(56) References Cited

U.S. PATENT DOCUMENTS

| | | | | | |
|---|---|---|---|---|---|
| 4,859,092 A | * | 8/1989 | Makita | ....................... | 248/921 |
| 4,960,256 A | * | 10/1990 | Chihara et al. | ................ | 16/361 |
| 5,083,290 A | * | 1/1992 | Hosoi | ......................... | 361/681 |
| 5,103,376 A | * | 4/1992 | Blonder | ...................... | 16/229 |
| 5,107,402 A | * | 4/1992 | Malgouires | ................... | 16/307 |
| 5,119,239 A | * | 6/1992 | Iaquinto et al. | ............. | 348/794 |
| 5,165,145 A | * | 11/1992 | Sherman | ...................... | 16/303 |
| 5,168,426 A | * | 12/1992 | Hoving et al. | ................ | 16/361 |
| 5,255,214 A | * | 10/1993 | Ma | ............................ | 361/680 |
| 5,267,123 A | * | 11/1993 | Boothroyd et al. | ........... | 16/361 |
| 5,268,817 A | * | 12/1993 | Miyagawa et al. | ......... | 361/681 |
| 5,337,212 A | * | 8/1994 | Bartlett et al. | .............. | 248/920 |
| 5,345,362 A | * | 9/1994 | Winkler | ...................... | 248/456 |
| 5,494,447 A | * | 2/1996 | Zaidan | ......................... | 16/361 |
| 5,548,478 A | * | 8/1996 | Kumar et al. | .................. | 16/223 |
| 5,594,619 A | * | 1/1997 | Miyagawa et al. | ......... | 361/681 |
| 5,991,150 A | * | 11/1999 | Chiu et al. | .................... | 359/742 |
| 6,005,767 A | * | 12/1999 | Ku et al. | ..................... | 345/169 |
| 6,108,716 A | * | 8/2000 | Kimura et al. | .............. | 345/168 |
| 6,229,693 B1 | * | 5/2001 | Karidis et al. | .............. | 361/681 |
| 6,262,885 B1 | * | 7/2001 | Emma et al. | ................ | 361/679 |
| 6,366,935 B2 | * | 4/2002 | Hawkins et al. | ............ | 345/169 |
| 6,430,038 B1 | * | 8/2002 | Helot et al. | ................. | 248/917 |

FOREIGN PATENT DOCUMENTS

| | | | | | |
|---|---|---|---|---|---|
| DE | | 3935042 C1 | * | 3/1991 | ............. G06F/1/16 |
| JP | | 03-278212 A | * | 9/1991 | ............. G06F/1/16 |
| JP | | 05-108203 A | * | 4/1993 | ............. G06F/1/16 |
| JP | | 05-173668 A | * | 7/1993 | ............. G06F/1/16 |
| JP | | 06-83479 A | * | 3/1994 | ............. G06F/1/16 |
| JP | | 06-175750 A | * | 6/1994 | ............. G06F/1/16 |
| JP | | 06-187068 A | * | 7/1994 | ............. G06F/1/16 |
| JP | | 08-054962 A | * | 2/1996 | ............. G06F/1/16 |
| JP | | 09-134132 A | * | 5/1997 | ............. G09F/9/00 |
| JP | | 10-326121 A | * | 12/1998 | ............. G06F/1/16 |

* cited by examiner

Primary Examiner—Anatoly Vortman
(74) Attorney, Agent, or Firm—J. Bruce Schelkopf (57) ABSTRACT

To provide a portable computer in which a height and angle of a display can be adjusted even in a restricted installation space. In a notebook type personal computer, at an approximately middle portion in a high and low direction of an LCD unit, disposed in a lid, there is provided a hinge, which enables the LCD unit to pivot around a rotation axis crossing perpendicularly with the high and low direction of the LCD unit. This hinge is mounted so as to be movable in the high and low direction of the frame, and is disposed at a higher position than a top of the frame. Thereby, even when rear space where the notebook type PC is installed is restricted, it is possible to adjust the height and angle of the LCD unit, and to make such setting as to enable the display screen to be easily watched.

6 Claims, 11 Drawing Sheets

PORTABLE COMPUTER

FIELD OF THE INVENTION

The present invention relates to a portable computer, and more particularly to a portable computer having a display, the height of which is capable of being adjusted with respect to the computer body.

BACKGROUND OF THE INVENTION

Generally, in a portable computer, including but not limited to devices such as a notebook type personal computer, a PDA apparatus and the like, a lid containing a LCD display (hereinafter, referred to "display" simply), which serves as a display unit, is pivotably connected to a back end of the computer body equipped with a keyboard by the use of a hinge portion, or the like, such that it may be opened or closed.

During carrying, it is known that an entire computer can readily be made compact by closing the lid to superimpose it on the computer body. At the same time the display and the keyboard are covered, each is also protected so as not to be damaged by the presence of the cover over each.

During use, the display and the keyboard are exposed by opening the lid so that a keyboard operation can occur and a user may view the display, that is, an operation of the computer can be performed. Also, the computer is configured such that the display can be set at an angle to enable the user to easily watch the display by adjusting an open-close angle of the lid as required.

As described above, in the conventional portable computer, the display screen can be adjusted at such an angle as to enable the user to easily watch the screen by rotating the lid, but the display's position cannot be changed otherwise. Therefore, when the screen should be changed to such a position as to be easily watched by changing the display's height, there was no other choice but to cope with it by changing the computer's installation height. This, however, changes also the keyboard's height so that it bercomes difficult to operate.

However, in Published Unexamined Patent Application No. 10-326121 and the like, which is incorporated herein by reference, a technique of changing the display's height is provided. In Published Unexamined Patent Application No. 9-134132, incorporated herein by reference, there is disclosed a technique of expanding the display upward to enlarge the screen, and in Published Unexamined Patent Application No. 6-187068, incorporated herein by reference, there is disclosed a structure in which almost middle portions of both sides of the lid are pivotably supported by a pair of arms. In this latter Published Unexamined Patent Application No. 6-187068, when such a lid as described above is superimposed on the computer body, it becomes possible to expose the display by reversing the lid, and in this state, the computer is capable of coping with inputted entry from a lightpen or the like via the display (touch panel type).

However, in recent years, there has been increasing need for a portable computer to be used while a user is moving by airplane, train or the like. In these situations, however, one critical concern involves the availability of installation space for the computer.

For instance, when using the portable computer in the airplane or the like, a computer is usually used by being placed on a table arranged in relation to a back surface of a backrest of nearby forward seat, but since the backrest is also present as indicated (i.e., beyond the table and behind the computer), the opening angle of the lid may be restricted so that the screen cannot be set at such an angle to enable the user to readily view. Particularly, in a state in which the backrest of the forward seat has been angled towards the computer user, it becomes increasingly difficult to adjust the angle of the display because the backrest projects into an upper space of the table. However, when an attempt is made to change the display's height or angle in accordance with the technique of the Published Unexamined Patent Application No. 10-326121 in such a state, that is, at an installation place where a rear space or a part of an upper space of the computer is restricted, height and angle adjustment becomes very difficult because the display screen cannot be watched structurally if the lid is not opened to an almost right angle or better with respect to the computer body (up to the back side of the computer body) according to this technique. According to this technique, a hinge portion for pivotably supporting the display is provided at the lower end portion of the display, and therefore, it is necessary to increase a braking force (rotation torque of the hinge portion) for supporting the weight of the display for braking. A slide portion for slidably supporting this hinge portion is provided on the lid side, and this slide portion has to firmly support the hinge portion which exerts a great braking force during the rotation of the display. Therefore, there is a clear disadvantage in overcoming the present situations since a robust structure is required and the resulting weight is increased.

Further, for the sliding structure, it is desired to ensure that the hinge portion is able to uniformly slide in a lateral width-wise direction crossing perpendicularly with the sliding direction because when the hinge portion is inclined toward the sliding direction, frictional resistance with the slide portion is increased to cause it not to operate smoothly. In order to realize this, the slide portion must be made more robust in the structure according to the above described conventional technique, in which the display hinge portion is supported only by the slide portion, and therefore, the portability, and the like, of the computer will be noticeably worsened.

SUMMARY OF THE INVENTION

In consideration of the above described facts, it is an object of the present invention to provide a portable computer which is intended to be capable of adjusting the display's height and angle without deteriorating the keyboard's operability, and to make the operability be more favorable for a user in the adjustment of the display's height even when the place for installing the portable computer is restricted in the rear space or the upper space.

In order to achieve the above described object, according to one aspect of the present invention, there is provided a portable computer having: a body having a keyboard thereon; a lid for covering the keyboard, the lid being pivotably connected to a back end of the body, so the lid may be opened and closed accordingly; a display being disposed in the lid; a hinge portion enabling the display to pivot around a first perpendicular line crossing perpendicularly with a high and low direction of the display at an almost middle position in the high and low direction, the hinge portion being mounted at the almost middle position in the high and low direction; and movable means enabling the hinge portion to move in the high and low direction and to be positioned at a higher position than a top of the lid when the lid is opened, the movable means being disposed between the lid and the display.

In the above described portable computer, the hinge portion is mounted at a position which is approximately near the middle of the display disposed in the lid in the high and low direction. This hinge portion enables the display to pivot around the first perpendicular line crossing perpendicularly with the high and low direction of the display, whereby the display can pivot around the perpendicular line to the high and low direction at the almost middle position in the high and low direction. This hinge portion is caused to move in the high and low direction of the display and to be positioned at a higher position than a top of the lid when the lid is opened by the movable means disposed between the lid and the display.

Therefore, when the lid, which is pivotably connected to the back end of the body, is opened, and the display is moved upward in the high and low direction to adjust it at a suitable angle at that elevated position, the angle can be readily changed by pivoting the display in an inclined posture (position where the body makes an acute angle with the lid when observed from its side), in which the display is disposed almost above the body, without inclining the lid on the back side of the body (position where the body makes an obtuse angle with the lid when observed from its side).

Accordingly, even when the rear space or the upper space to the rear of the computer is restricted or limited at a place where the portable computer is installed, it becomes possible to adjust the display's height and angle, and the setting can be made so that the user can more readily view the display screen.

The hinge portion is displaced at approximately the near middle position of the display in the high and low direction, whereby the center of rotation of the display is to be placed near the center of gravity of the display, and for example, in such structure that a braking force due to friction or the like is imparted to the hinge portion to brake the rotation of the display, the display can be easily braked by a small braking force. In other words, the display can be supported with stability without rattling even if the braking force of the hinge portion is small. In the rotating operation to change the angle of the display, the operability will be improved because the rotation can be easily made by a small operating force (rotation torque).

With regard to the movable means in the portable computer, it may be also possible to configure it so as to enable the hinge portion to move by providing the lid side with a guide groove along the high and low direction of the display, and slidably engaging a slide portion into this guide groove, the slide portion being provided in a movable member, which has the hinge portion and is movable therewith.

By way of example, the configuration (movable means) of the computer, by which the display (hinge portion) is made movable with respect to the lid as described above, includes a combination of the guide groove provided on the lid side and the slide portion, which is slidable within the guide groove, whereby the movable means can be provided in a simple structure.

The portable computer may also have link means for coupling the movable member to the lid. This link means is configured by two links with the almost same length, which are pivotably coupled to each other at approximately their near middle portions, and intersect. Thus, each of first end portions of the two links is coupled with the lid at a predetermined interval respectively in a second perpendicular line crossing perpendicularly with the high and low direction of the display, and each of second end portions thereof is coupled with the movable member respectively in a third perpendicular line crossing perpendicularly with the high and low direction of the display. Further, of each of the first end portions and each of the second end portions, at least any one of the end portions disposed on the same side in the lateral width-wise directions with respect to the high and low direction of the display is provided to be directionably slidable inclusive of directions along the first perpendicular line and the second perpendicular line respectively.

As described above, the link means configured by two links, which are pivotably coupled with each other at approximately their near middle portions, and intersect is used, and the end portions of each link are coupled with the movable member and the lid respectively, whereby when the movable member (display) moves in the high and low direction, amounts of movement at the left and right side end portions of the movable member become always the same, and the end portions are to move straight (uniformly at the left and right side end portions) along the moving direction.

Therefore, even if one side end portion of the display is grasped to lift it up, for example, when the display's height is changed, left-right balance is maintained to provide a smooth operation. Also, even when the movable means is a combination of the guide groove and the slide portion, there is no possibility that the left-right moving balance is lost to increase sliding load. Therefore, the operability when the display's height is adjusted is improved.

The portable computer of the present invention can be manufactured at low cost, as there is limited complexity, and the present invention further provides a solution enabling the computer to be lightweight and compact.

In this respect, as used below, "direction along the third perpendicular line" here expresses the moving direction of each of the other end portions coupled with the movable member respectively. Here, where each of the other end portions coupled with the movable member is also directionally slidable in a direction along the third perpendicular line in addition to the up-and-down movement because it necessarily moves in the up-and-down direction along with the up-and-down movement (operation of the link means) of the movable member.

Further here, of each of first end portions and each of second end portions, only each of the first or second end portions disposed on the same side in the lateral width-wise directions with respect to the high and low direction of the lid may be slidable in a direction including directions along the second perpendicular line and the third perpendicular line respectively, and in addition, each end portion on both the left and right sides may be both caused to slide.

The lid in the portable computer may include an internal frame member, which constitutes an interior shell of the lid, is supported by the back end of the body, and has a guide groove provided on the lid side, and a cover member, which is disposed on the outer surface side of the internal frame member, and is made shiftable between a covering position whereat the cover member covers the outer surface in almost tight contact with the outer surface, and an spaced-apart position whereat the cover member is spaced apart from the outer surface.

The lid is configured by the internal frame member and the cover member, and the cover member is made shiftable to a position spaced apart from the internal frame member, whereby there is formed a gap between the internal frame member and the cover member at the spaced-apart position. The shift to this spaced-apart position may be performed by, for example, parallel movement of the cover member with respect to the internal frame member.

Thereby, there is no need for new provision of space for moving the movable member, space for operating the link means and the like within the lid, but the portable computer can be miniaturized and higher density can be attained.

Further, the cover member may be supported in coaxial with an open-close driving axis of the internal frame member and be made pivotable relative to the internal frame member.

Through the use of a hinge portion, a rotating shaft or the like for supporting, for example, the internal frame member, the cover member can be pivotably supported in the same axis as the open-close driving axis of the internal frame member. Thereby, the structure for shifting the cover member is simplified and any increase and the like in the computer weight and cost can be suppressed.

In the configuration having a cable member for electrically connecting the body to the display in the portable computer, the cable member may be guided through between the internal frame member and the cover member for wiring.

This cable member is used to perform supply of electric power, communication of signals and the like for driving, for example, the display between the body and the display. In a configuration, in which the display moves relative (up and down movement) to the body, the cable member causes deformation such as bending along with the movement of the display. When the display moves up and down, however, it is avoided for the cable member deformed t be sandwiched between both members, to be subject to excessive stress or to be damaged by rubbing because the cover member is spaced apart from the internal frame member to form a gap.

Since there is no need for any provision of space for not preventing deformation of the cable member within the lid even here, miniaturization of the portable computer can be promoted.

BRIEF DESCRIPTION OF THE DRAWINGS

FIGS. 5A and 5B are partial sectional views schematically showing a locking mechanism for a cover according to an embodiment of the present invention: FIG. 5A shows a state in which the cover is locked, and FIG. 5B shows a state in which the cover is unlocked and is rotated backward;

Description of the Invention

Figure 1:
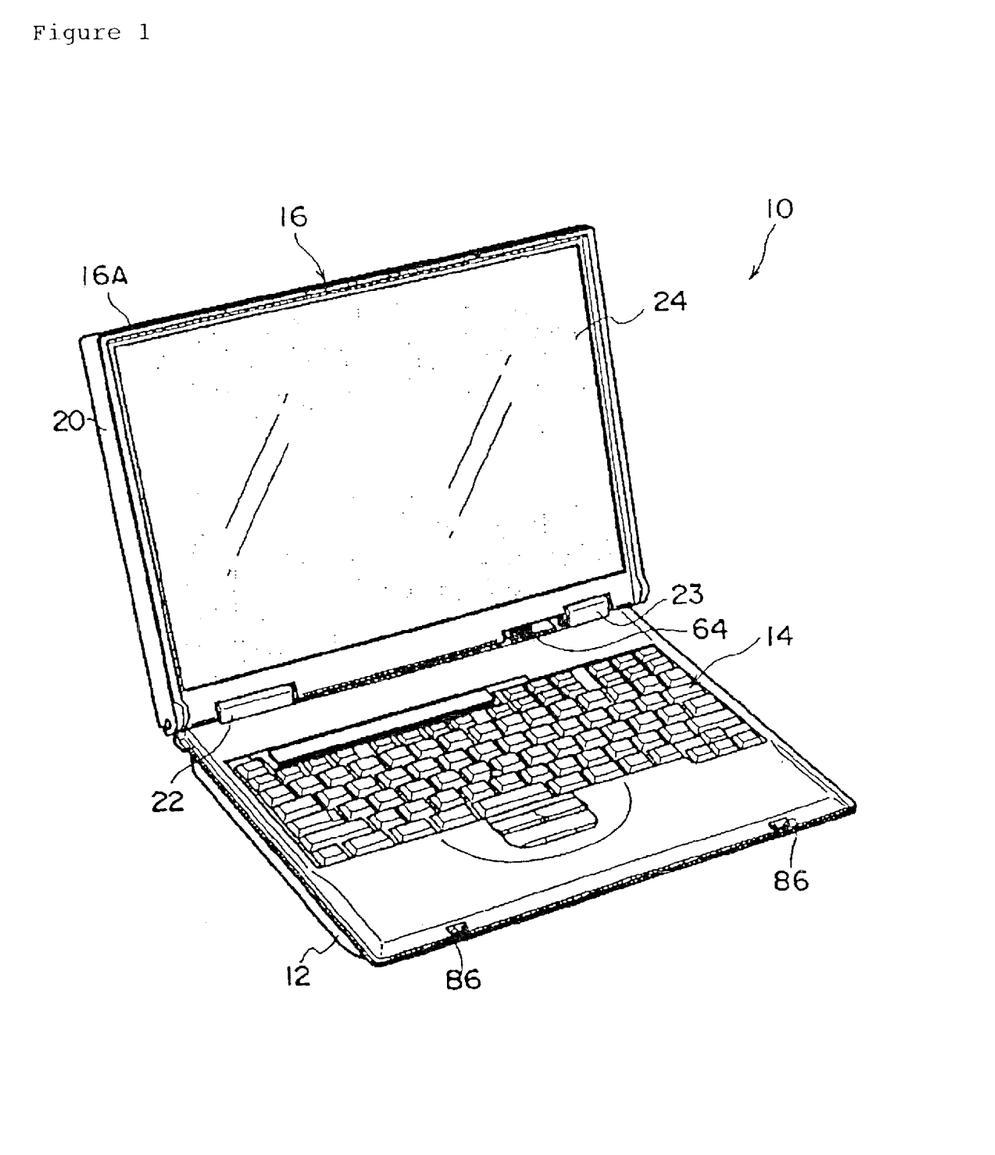
FIG. 1 is an external view showing a notebook type PC according to an embodiment of the present invention.
Figure 2:
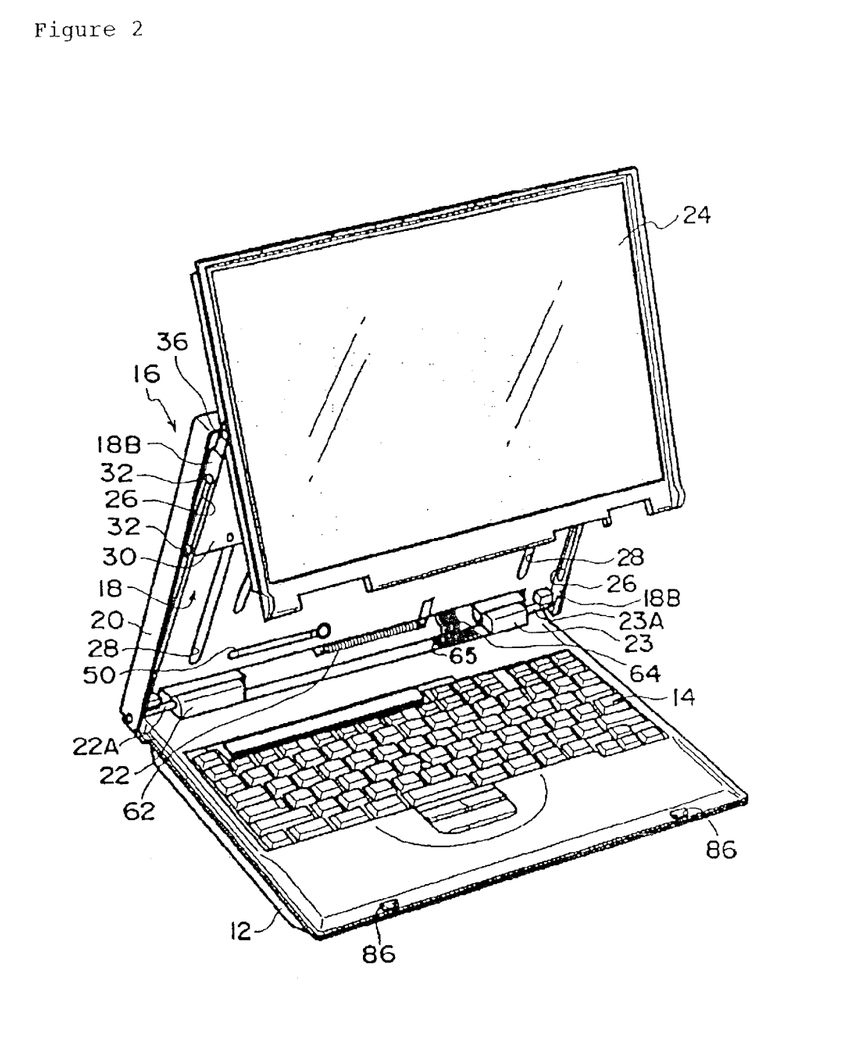
FIG. 2 is an external view showing a state in which the LCD unit is raised in the notebook type PC of FIG. 1.

FIGS. 1 and 2 show a notebook type personal computer 10 (hereinafter, referred to as notebook type PC 1O) according to an embodiment of the present invention.

As shown in FIG. 1, the PC body 12 of a notebook type PC10 has a keyboard 14 disposed on the top, and within the PC body 12, a system board, in which CPU, a memory, a peripheral controller chip and the like are packaged, and each peripheral apparatus including storage devices such as a hard disk drive (HDD), a floppy disk drive (FDD) and a CD-ROM drive are housed.

A lid 16 is pivotably connected to a back end of the PC body 12 so as to be openably and closeably operable (i.e., such that the lid may be open or closed). The lid 16 is configured by a frame 18 (See FIG. 2), which serves as a core (interior shell) of the lid 16, and a cover 20, which covers the outer surface of the frame 18, such that the lid 16 can be opened and closed by the frame 18 being hinge-coupled by a pair of hinges 22 and 23 disposed in the PC body 12.

On the inner surface side of this lid 16, there is disposed a liquid crystal display (LCD) unit 24. FIG. 2 shows a state in which the LCD unit 24 has been adjusted to an easily viewable angle when the lid 16 is a little tilted on this side by lifting up the LCD unit 24. Hereinafter, the detailed description will be made of a mechanism for moving the LCD unit 24 up and down as described above to adjust the angle.

In this respect, when indicating up-and-down positional relationship and the high and low direction for explaining concerning the frame 18 and the lid 16 including the cover 20 and the like, the up-and-down relationship will be described with the posture shown in FIG. 1 and the like, in which the lid 16 has been opened (state in which the use of the notebook type PC 10 is available) as the standard.

Figure 3:
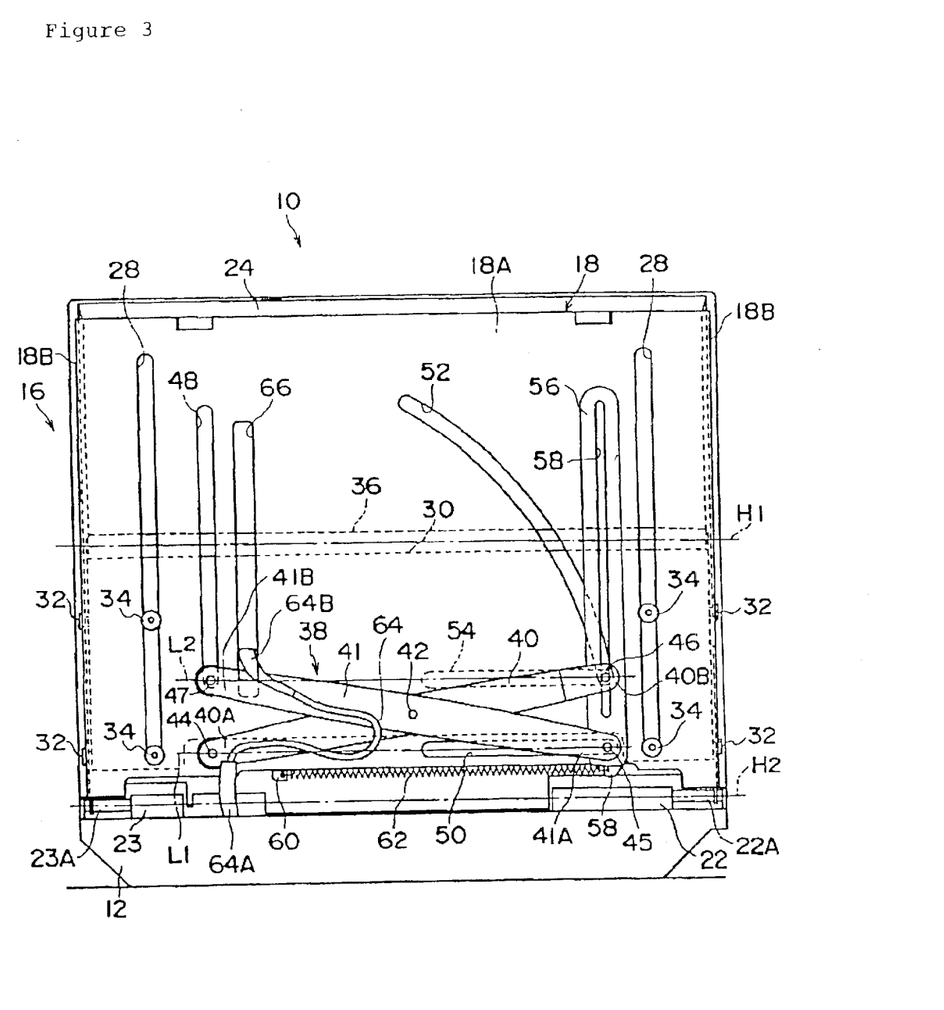
FIG. 3 is a view showing the interior of the lid of the notebook type PC as viewed from the back surface side in the state of FIG. 1.
Figure 4:
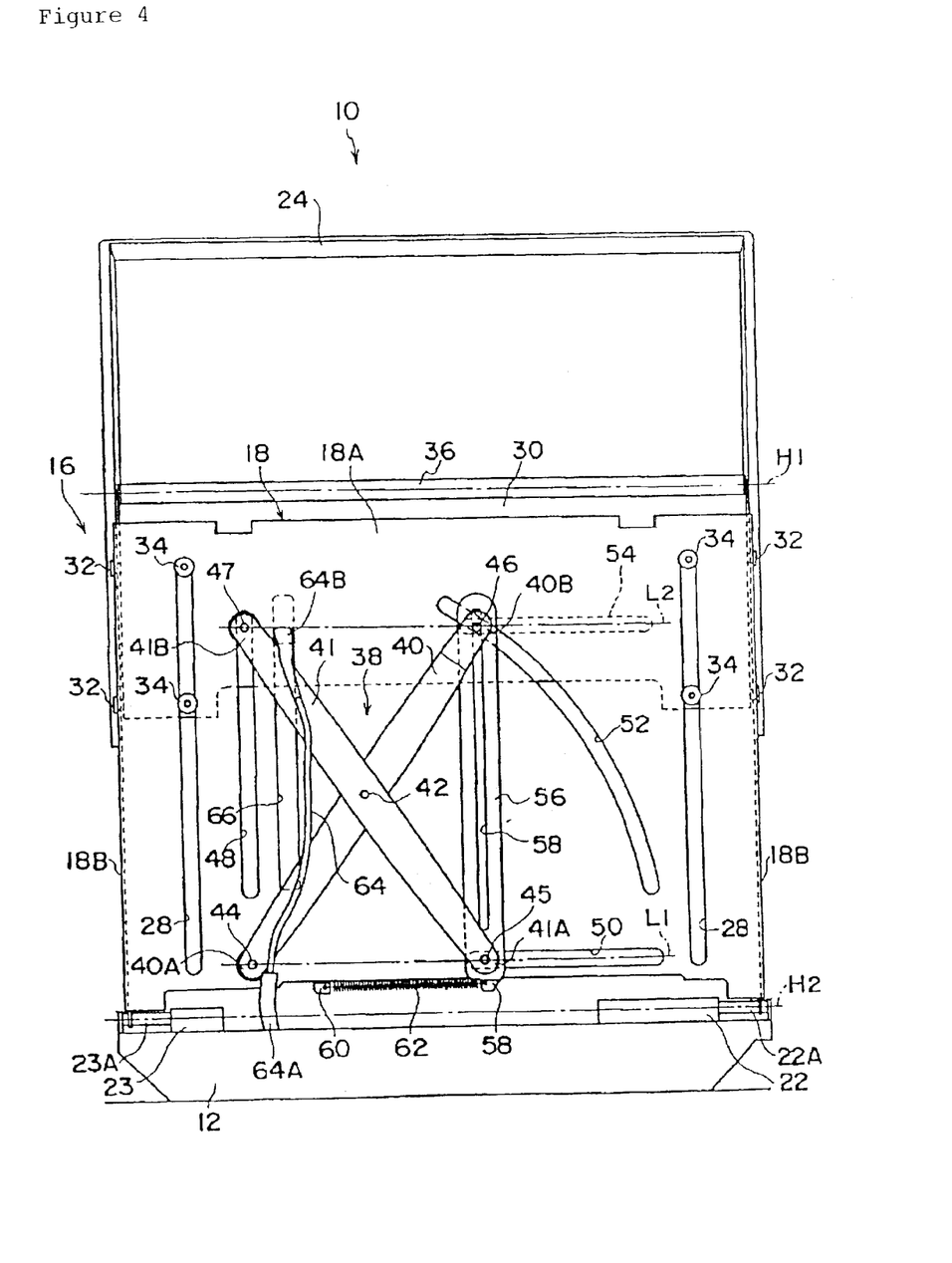
FIG. 4 is a view showing the interior of the lid of the notebook type PC as viewed from the back surface side in the state of FIG. 2.

FIG. 3 (corresponding to FIG. 1) and FIG. 4 (corresponding to FIG. 2) show a plan view in which the interior (frame 18) of the lid 16 is viewed from the back surface side. In these views, however, the illustration of the cover 20 is omitted in order to make it easier to understand the inner mechanism.

The frame 18 is preferably made of metal such as aluminum alloy, and is provided with a flat plate-like body 18A. Both right and left side end portions of the body 18A are bent at right angles and are opposed to each other, and the entire transverse cross section is formed in an almost U-shape. On its both side end portions 18B and 18B, there are formed a pair of guide grooves 26 and 26 along the high and low direction (longitudinal direction) of the frame 18 (See FIG. 2), and even in the vicinity of the right and left end portions of the body 18A, there are formed a pair of guide grooves 28 and 28 along the high and low direction of the frame 18.

On the inner surface side of the frame 18, a slide plate 30 is disposed. The slide plate 30 has a height dimension of about half that of the frame 18, and a width dimension a little smaller than the inside width dimension of the both side end portions 18B and 18B of the frame 18.

On the both right and left sides of the slide plate 30, there are respectively provided a pair of rollers 32 and 32 disposed at a predetermined interval in the high and low direction, and the pair each of rollers 32 and 32 are adapted to be engaged into the guide grooves 26 and 26 of the frame 18 so as to enable them to slide along the grooves respectively. Further, at positions corresponding to the guide grooves 28 and 28, there are respectively provided a pair of rollers 34 and 34 disposed at a predetermined interval in the high and low direction, and the pair each of rollers 34 and 34 are configured such that they are engaged into the guide grooves 28 and 28 to enable them to slide along the groove.

Thereby, the slide plate 30 is capable of moving in the up and down direction of the frame 18 with the pair each of rollers 32 and 32, and the pair each of rollers 34 and 34 being guided by the guide grooves 26 and 26, and the guide grooves 28 and 28 respectively.

On the upper end portion of this slide plate 30, there is disposed a hinge 36 with an axis H1, as the center of rotation, parallel (direction perpendicular to the high and low direction of the LCD unit 24) to the width-wise direction of the slide plate 30. The almost middle portion of the LCD unit 24 in the high and low direction is pivotably mounted to the hinge 36, and the hinge 36 is positioned at a higher position than the upper end edge of the frame 18 at the elevated position shown in FIG. 4, whereby the LCD unit 24 is pivotable around the axis HI with respect to the slide plate 30 through the hinge 36. In this respect, this hinge 36 has a predetermined braking force (rotation torque) and is adapted to enable the LCD unit 24 to be fixed at any angle.

Further, a locking mechanism (not shown) is provided between the slide plate 30 and the LCD unit 24. This locking mechanism normally (for example, state shown in FIG. 1 or FIG. 3) locks in a state in which the back surface of the LCD unit 24 is almost in surface contact with the slide plate 30. When the LCD unit 24 (slide plate 30) is moved to the top of the frame 18 (state shown in FIG. 2 or 4), the LCD unit 24 is adapted to be pivoted by manually releasing the lock. In this respect, this locking mechanism may be automatically unlocked at the above described unlock position, and at that position, the LCD unit 24 is to be held without rattling by the braking force of the hinge 36.

Further, the slide plate 30 and the frame 18 are coupled by a X link 38 having such a X-character shape as shown. The X link 38 is configured by a pair of links 40 and 41, having the same shape, and the links 40 and 41 are made pivotable each other by being coupled by a joint 42 at the respective middle portions.

Each of lower end portions 40A and 41A of these links 40 and 41 is pivotably coupled to the lower end portion of the frame 18 through joints 44 and 45 respectively at a predetermined interval in a perpendicular line L1 crossing perpendicularly with the high and low direction (high and low direction of the LCD unit 24) of the frame 18. Each of upper end portions 40B and 41B of the links 40 and 41 is pivotably coupled to the vicinity of the middle portion of the slide plate 30 in the high and low direction through joints 46 and 47 respectively in a perpendicular line L2 crossing perpendicularly with the high and low direction of the frame 18.

The joint 44 for coupling the lower end portion 40A of the link 40 to the frame 18 is coupled to the frame 18 (joint which serves as the standard) such that the relative position to the frame 18 does not change. The joint 47 located above this joint 44 is adapted to be able to move only in the up and down direction by sliding within the guide groove 48 formed in the frame 18 along the high and low direction.

The joint 45 is adapted to be able to move only in the right-and-left direction by sliding within a guide groove 50 formed in the perpendicular line L1 in the frame 18 along a lateral width-wise direction, and the joint 46 is adapted to be able to move circumferentially with the joint 44 as the center. In order to enable this movement, the frame 18 is formed with a guide groove 52 assuming a circular arc configuration along a moving locus of the joint 46, and the slide plate 30 is formed with a guide groove 54 along the right-and-left direction in the perpendicular line L2 which becomes a position corresponding to the joint 46. Thereby, the joint 46 comes to be able to move circumferentially with respect to the frame 18, and to move relatively in the right-and-left direction with respect to the slide plate 30.

Thus, the X link 38 is to perform such an operation of extending in the high and low direction as shown in from FIG. 3 to FIG. 4 and an operation of contracting conversely in synchronization with the up-and-down movement of the slide plate 30 and with the joint 42 as the center of rotation. At the same time, a load to be applied to each of the right and left-side end portions of the slide plate 30, to which the LCD unit 24 is mounted, or each of respective forces to be applied to the right and left-side end portions during operation for the up-and-down movement is undergone by the frame 18 through the links 40 and 41 of the X link 38.

Accordingly, the slide plate 30 and the LCD unit 24 will move without tilting with the right and left sides kept in balance during the up-and-down movement, and frictional resistance during sliding to be produced between each roller and each guide groove will be made small to thereby operate them smoothly.

Further, an auxiliary plate 56 for coupling the lower end portion 41A of the link 41 to the upper end portion 40B of the link 40 is mounted to the X link 38. The lower end portion of the auxiliary plate 56 is pivotably coupled to the joint 45 so as to interlock with the lower end portion 41A of the link 41, and the joint 46 is slidably engaged into the guide groove 58 formed along the high and low direction, and is coupled to the upper end portion 40B of the link 40.

A hook 58 is provided at the lower end edge of the auxiliary plate 56, and a hook 60 disposed at a predetermined distance to the left of the hook 58 in the figure is provided at the lower end portion of the frame 18. A spring 62 is installed between the hook 58 and the hook 60, and the auxiliary plate 56 is biased toward the hook 60 by a biasing force of the spring 62. Thereby, the configuration is made such that there are provided functions for keeping, in balance, the weight of the slide plate 30, the LCD unit 24 and the like, a force (biasing force of the spring 62) for lifting up the slide plate 30 conversely while supporting the load through the X link 38, and a frictional force for exerting between the guide grooves 26 and 28, and the rollers 32 and 34, and for causing the LCD unit 24 to stop at any height. In addition, a moderate braking force is exerted on the up-and-down movement of the LCD unit 24 to make the operation smoother.

In this respect, although not provided in detail, a mechanism for substantially fixing the up-and-down movable LCD unit 24 halfway is not limited to the mechanism according to this embodiment, but it can be caused to function by replacing it with another mechanism or by combining it with another mechanism. It may be also possible to provide, for example, a latch mechanism or the like between the slide plate 30 and the frame 18, or between the guide groove 26 and 28 and the roller 32 and 34, and the like for setting the LCD unit 24 at any height or by changing the height stepwise by the latch mechanism.

A notebook type PC10 according to this embodiment has a cable 64 for electrically connecting the PC body 12 to the LCD unit 24. The cable 64 is disposed in the vicinity of the left side-end portion of the X link 38 and is guided through on the outer surface side( on this side in FIGS. 3 and 4) of the frame 18. A cable proximal end side 64A is inserted from the vicinity of the lower end portion 40A of the link 40 into a slit 65 (See FIG. 2) at the back end portion of the PC body 12, and is connected to the interior of the body. A cable tip end side 64B is connected to the rear surface of the LCD unit 24 in the vicinity of the upper end portion 41B of the link 41.

On the frame 18, an elongated groove 66 along the high and low direction is formed at a position corresponding to the cable tip end side 64B, and the cable tip end side 64B is adapted to be passed through this elongated groove 66 so as to move along with the up-and-down movement of the LCD unit 24.

On the other hand, the cover 20 constituting a portion of the lid 16 is preferably made of a resin material. The cover 20 is made a size larger than the frame 18, and covers the outer surface side, with the exception of the frame inner surface on which the LCD unit 24 has been disposed. Further, the lower end portions of both lateral side walls of the cover 20 are pivotably supported by supporting shafts 22A and 23A, which are coaxial with a rotation axis H2 of the hinges 22 and 23 and protrude from the hinges 22 and 23 outward respectively.

Thereby, the cover 20 is configured so as to be able to rotate in a direction to be separated from the frame 18 as shown in FIG. 2 independently of the open-and-close operation of the frame 18 (lid 16). Although illustration is omitted, a stopper mechanism for regulating a range of rotation of the cover 20 is installed between the cover 20 and the frame 18, so that the cover 20 is not separated from the frame 18 more than necessary.

Figure 5:
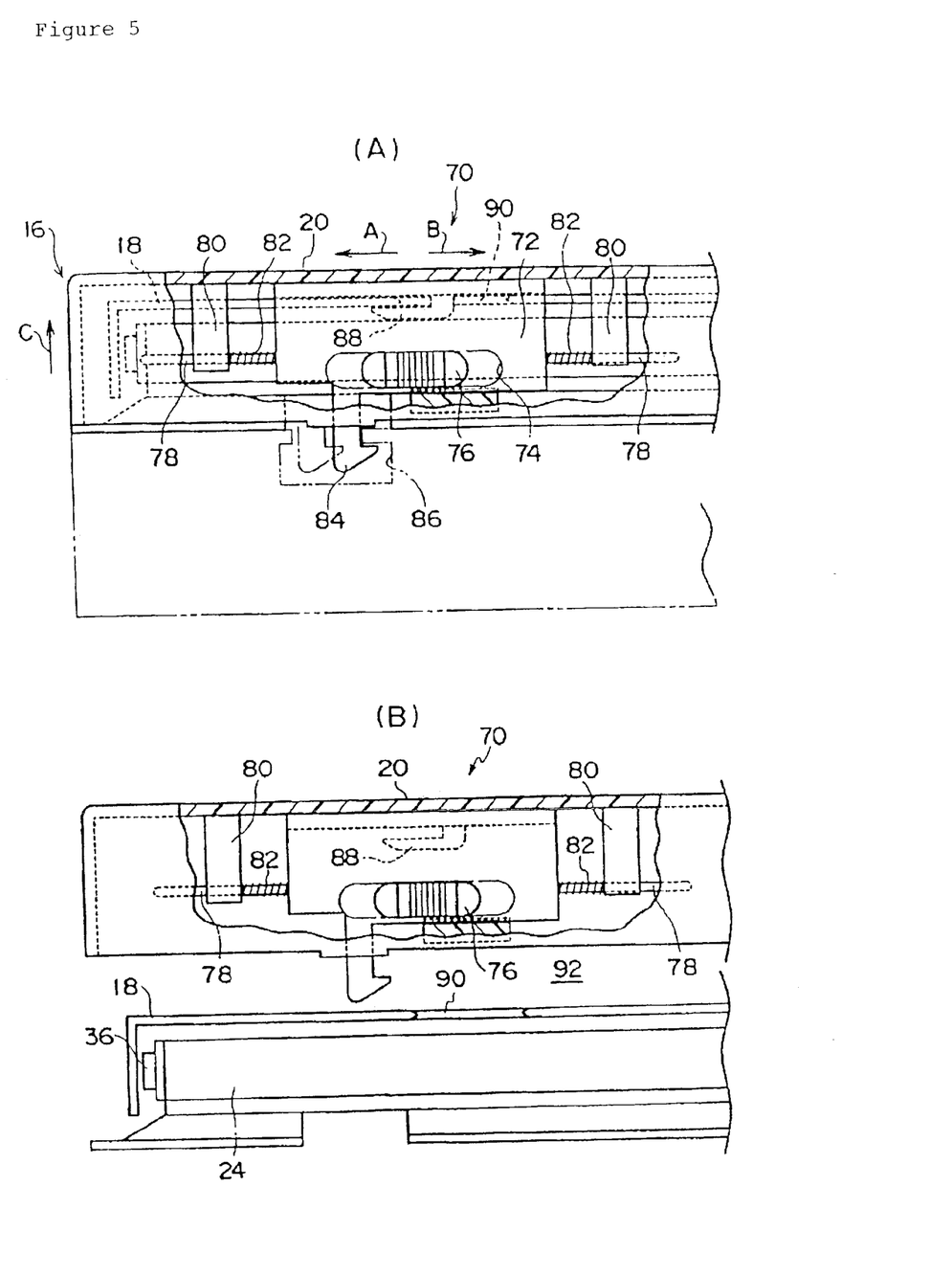

As described above, the cover 20 is separated from the frame 18, whereby the upper portion of the frame 18 is to be released, making it possible for the LCD unit 24 disposed within the frame 18 to lift up. Also, since a gap is formed between the frame 18 and the cover 20, space required for the X link 38 disposed on the outer surface side of the frame 18 to operate and space required for the cable 64 to be bent are sufficiently secured. Next, the description will be made of a locking mechanism for fixing this cover 20 to the frame 18. FIGS. 5A and 5B schematically show the locking mechanism for the cover 20 according to this embodiment.

The locking mechanisms shown in the same figures are disposed respectively in the vicinity of the right and left end portions of the inside of the upper end surface 16A (See FIG. 1) of the lid, and its one side (left side as viewed from the front) is enlarged. This has conventionally been used to lock the closed lid 16 to the PC body 12, but the notebook type PC10 according to this embodiment is configured so as to enable the cover 20 to be locked and unlocked in addition to the locking function of the lid 16.

The locking mechanism 70 has a slider 72 having a substantially L-character shape when observed from its side. The slider 72 is mounted to the cover 20 in accordance with the shape of the bent upper end portion of the cover 20 is bent. On the top of the slider 72, there is provided an operating unit 76 to be disposed within an elongated hole 74 on the upper end surface of the cover 20, and a pair of slide shafts 78 and 78, which protrude from both right and left sides of the top, are slidably inserted through each throughhole of a pair of supporting portions 80 and 80 which protrude on the inner surface of the cover 20 respectively. A compression coiled spring 82 is passed through each of these slide shafts 78 and 78.

Thereby, the slider 72 is to be returned to an almost middle position between the supporting portions 80 and 80 from a position whereat it has slid in the left or right direction by the biasing forces of the compression coiled springs 82 and 82 which have been disposed on both sides (position of FIG. 5A).

On the front (the inner surface side of the lid 16) of the slider 72, there is provided a latch portion 84 for locking the lid 16 to the PC body 12. At the solid line position of FIG. 5A, the latch portion 84 engages with an engaging hole 86 on the PC body 12 side to lock the lid 16. In order to release this locking, the operating unit 76 can be pushed in a direction indicated by an arrow A in the figure of the lid 16 (the operating unit of the locking mechanism disposed on the right side of the lid 16 is in the opposite direction). Thus, the engagement of the latch portion 84 is released (position indicated by a dots-and-dash line in the figure), and the locking of the lid 16 is released.

Further, inside the side portion of the slider 72, there is provided an engaging claw portion 88 having orientation opposite to that of a claw of the latch portion 84. This engaging claw portion 88 is restrained by a notch 90 formed on the upper end portion of the frame 18, whereby the cover 20 is fixed to the frame 18 in an almost tight contact state in which the frame 18 is covered.

When unlocking the cover 20, the operating unit 76 can be shifted in a direction indicated by an arrow B in the figure, which is opposite to the previous one. Thereby, the engaging claw portion 88 comes off from the notch 90, and if the cover 20 is grasped as it is to be rotated toward the back side (direction indicated by an arrow C in the figure), only the cover 20 is rotated and separated from the frame 18 to a predetermined position to form a gap 92 with the frame 18 (FIG. 5B).

At this predetermined position, since the latch portion 84 retracts to a place where it does not come to the frame 18 as viewed from above, lifting of the LCD unit 24 is not prevented.

In this respect, in the configuration in which the cover 20 is separated from the frame 18 as described above, entry of foreign matter or the like from an opening to be produced between both members is of possible concern. Thus, a sheet-like member for blindhold made of film material or the like may be disposed so as to lie astride the frame 18 and the cover 20 to protect the interior of the lid 16. If such a sheet-like member is utilized, it is preferable because the sheet-like member can be housed in an accordion shape even in a state in which the frame 18 is covered with the cover 20.

Next, the description will be made of an operation of this embodiment. FIGS. 6 to 10 show the state when the height of the LCD unit 24 is changed in a notebook type PC10 according to this embodiment.

Figure 6:
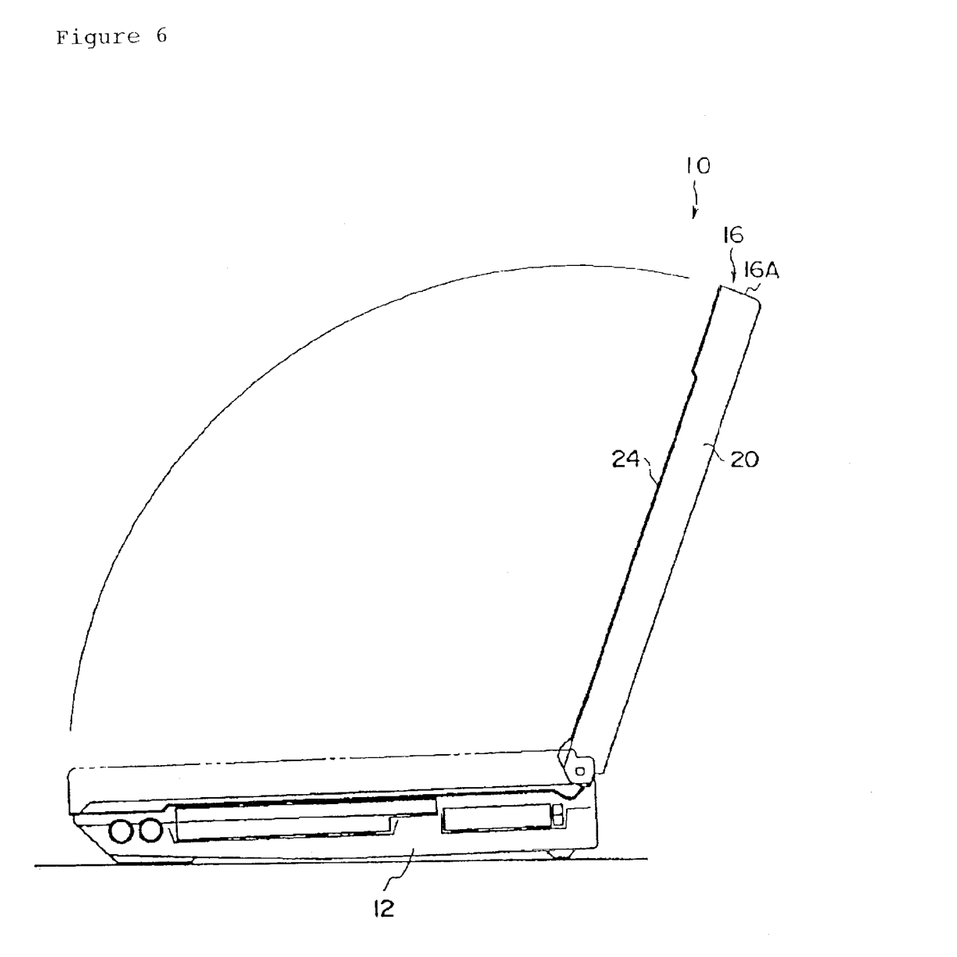
FIG. 6 is a view for explaining a process of a lifting operation of the LCD unit in the notebook type PC according to an embodiment of the present invention, and is a side view showing the notebook type PC of FIG. 1.
Figure 7:
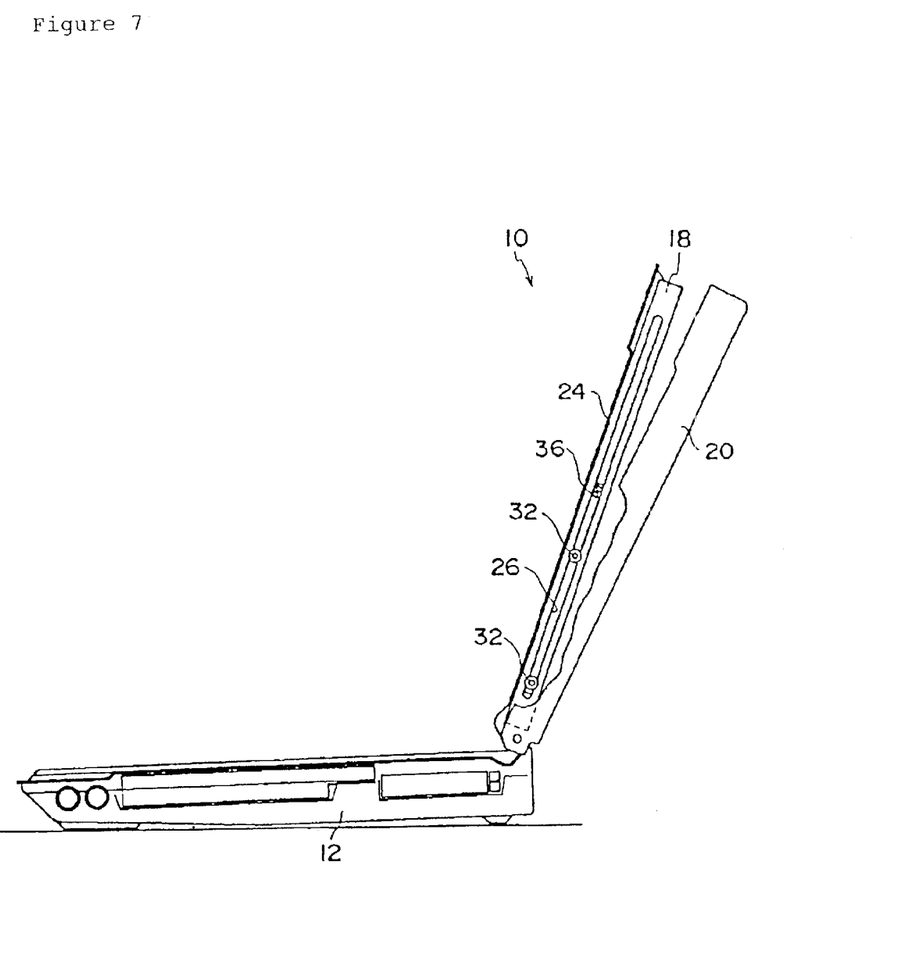
FIG. 7 is a view for explaining lifting and angle adjustment operations of the LCD unit in the notebook type PC according to an embodiment of the present invention, and is a side view showing a state in which the cover is rotated backward from the state of FIG. 6.

In FIG. 6, the lid 16 of the notebook type PC 10 is opened to a predetermined angle, and is used in the same manner as in the conventional one. Thus, in order to change the height of the LCD unit 24, a locking mechanism 70 disposed on the upper end surface 16A of the lid is first operated, and only the cover 20 is rotated backward to release the upper space of the frame 18 as shown in FIG. 7.

Figure 8:
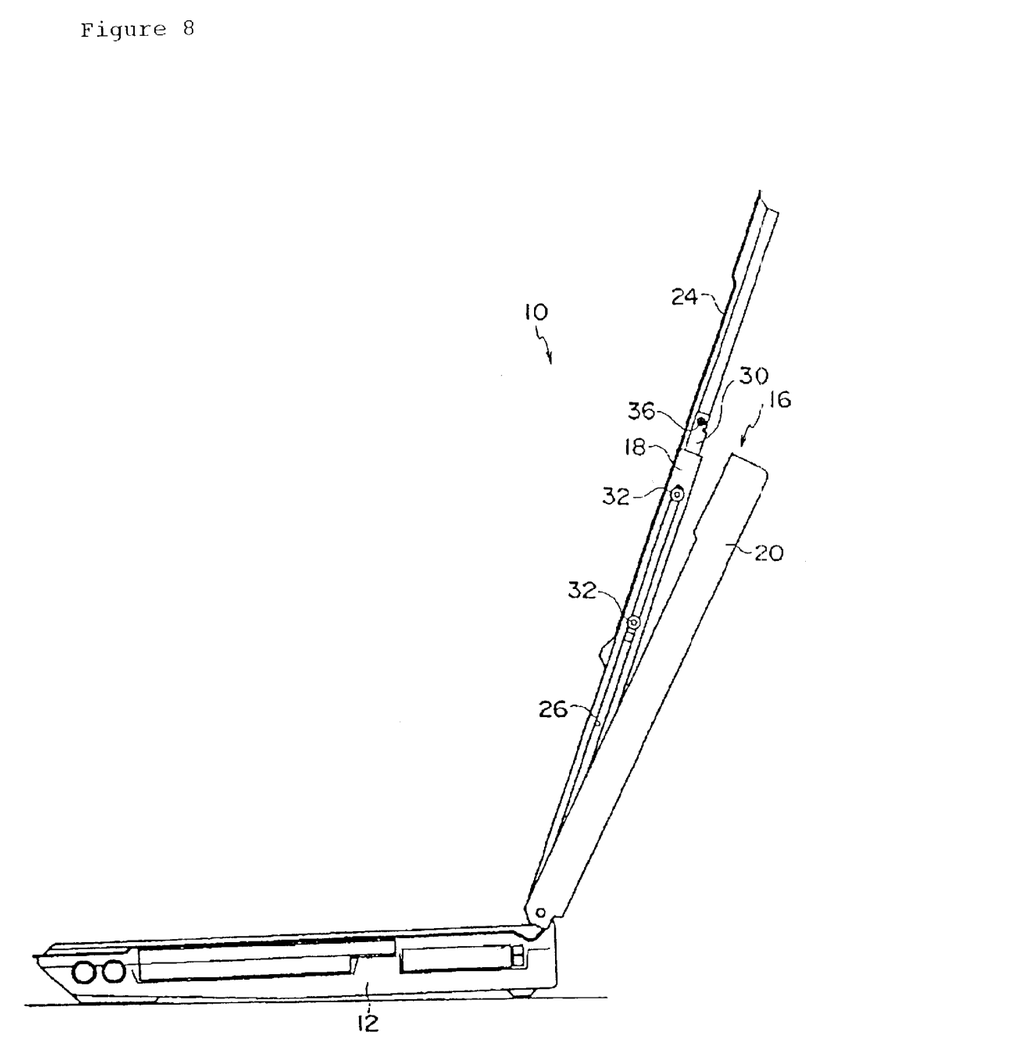
FIG. 8 is a view for explaining lifting and angle adjustment operations of the LCD unit in the notebook type PC according to an embodiment of the present invention, and is a side view showing a state in which the LCD unit has lifted from the state of FIG. 7.

If the LCD unit 24 is lifted up as it is, the slide plate 30 will slide upward along the frame 18 to lift up the LCD unit 24 as shown in FIG. 8. In this respect, since the LCD unit 24 is configured so as to be fixed at any height as described above, there is added convenience that it can be freely set to the user's preferred or desired height.

Figure 9:
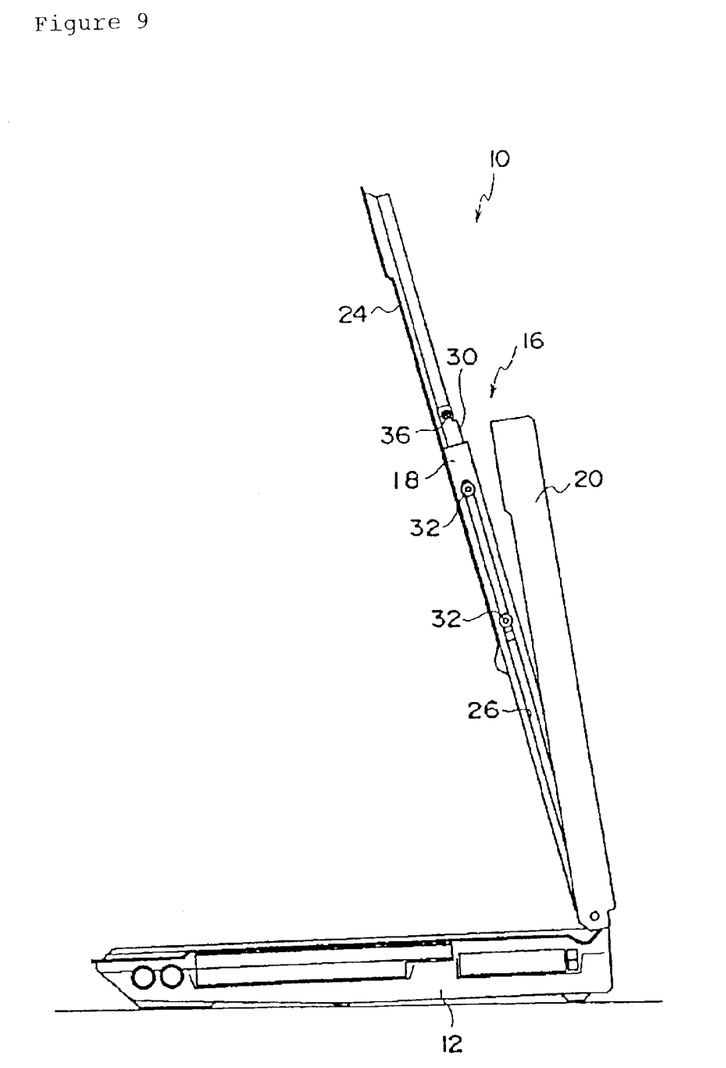
FIG. 9 is a view for explaining lifting and angle adjustment operations of the LCD unit in the notebook type PC according to an embodiment of the present invention, and is a side view showing a state in which the lid has been tilted on this side from the state of FIG. 8.
Figure 10:
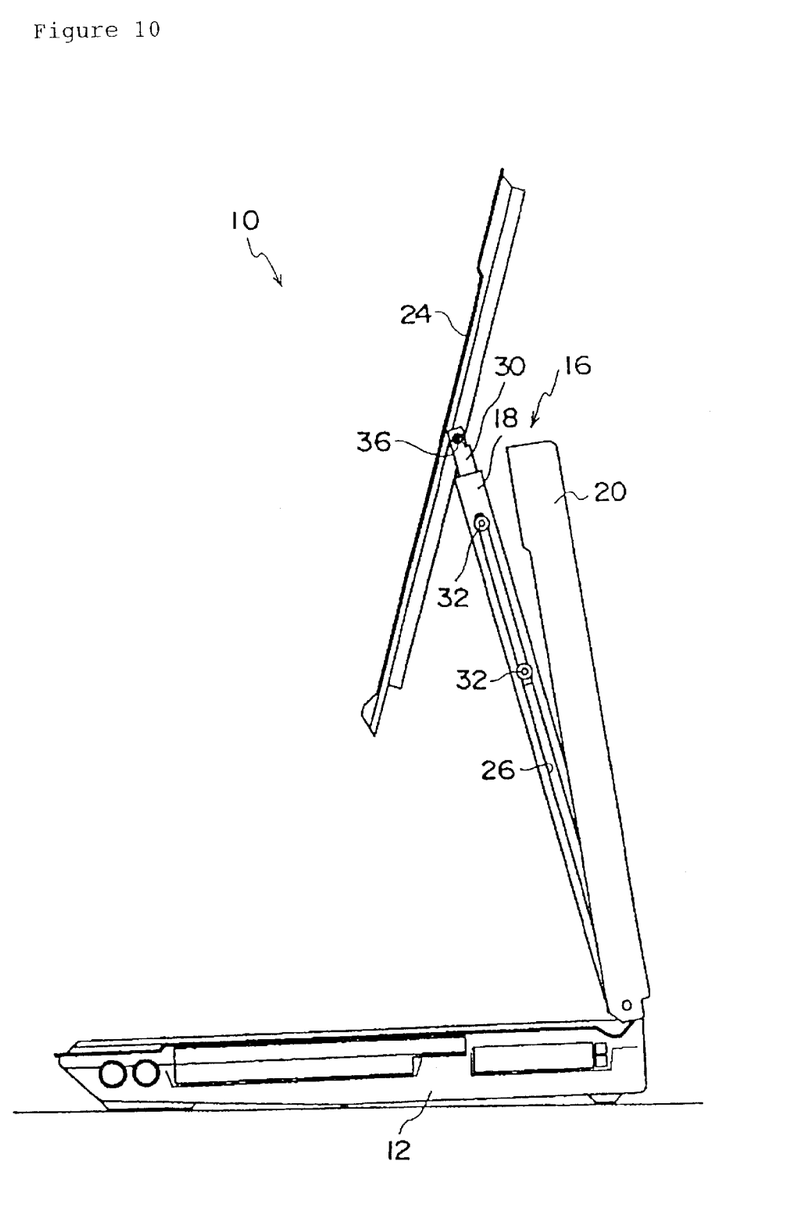
FIG. 10 is a view for explaining lifting and angle adjustment operations of the LCD unit in the notebook type PC according to an embodiment of the present invention, and is a side view showing a state in which the LCD unit has been rotated from the state of FIG. 9 and the angle has been adjusted so as to enable the screen to be easily watched.

At an installation place where any sufficient space cannot be secured behind the notebook type PC 10, it will be prevented to lift up the LCD unit 24 for use. At the time, after the lid 16 (the frame 18 and the cover 20) is a little tilted on this side as shown in FIG. 9, the LCD unit 24 can be rotated such that its screen faces obliquely upward as shown in FIG. 10.

Figure 11:
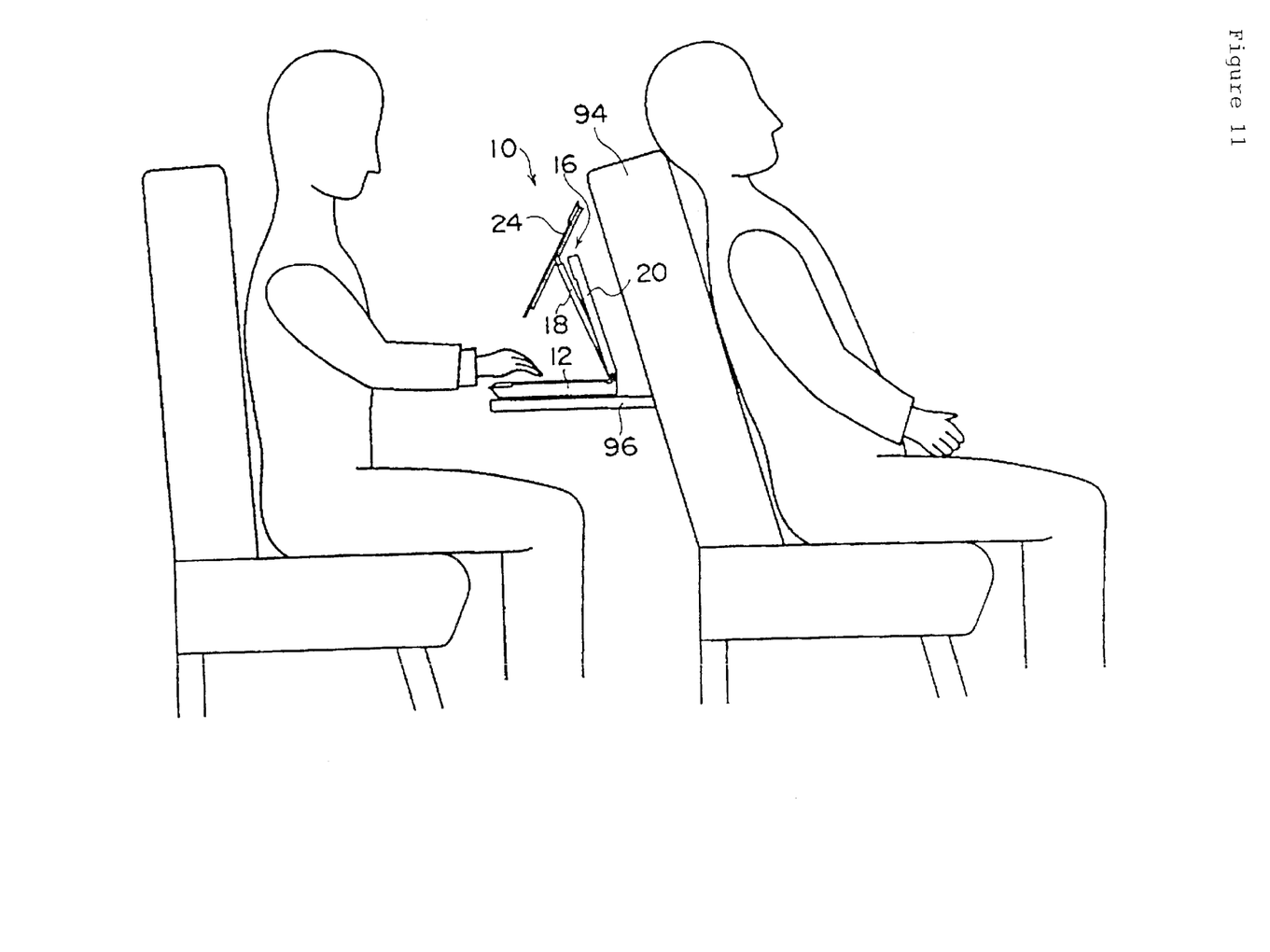
FIG. 11 is an explanatory view schematically showing a state in which a notebook type PC according to an embodiment of the present invention is used in an airplane.

FIG. 11 shows the state in which the user uses a notebook type PC 10 according to this embodiment when taking his seat in an airplane. Even if the backrest 94 of the just forward seat is inclined as shown, it is possible to set it on a table 96 for use by adjusting the height and angle of the LCD unit 24 as described with reference to FIGS. 6 to 10.

As described above, in the notebook type PC 10 according to this embodiment, at the approximately near middle portion of the LCD unit 24, disposed in the lid 16, in the high and low direction, there is provided a hinge 36, which enables the LCD unit 24 to pivot around a rotation axis H1 crossing perpendicularly with the high and low direction of the LCD unit 24. This hinge 36 is mounted to the slide plate 30 so as to move in the high and low direction of the frame 18, and is further disposed at a higher position than the top of the frame 18. Therefore, even when rear space or upper space near the rear in a place, where the notebook type PC 10 is installed, is restricted, it becomes possible to adjust the height and angle of the LCD unit 24, and to make such setting as to enable the display screen to be easily watched.

The hinge 36 is displaced at approximately the near middle position of the LCD unit 24 in the high and low direction, whereby the center of rotation of the LCD unit 24 is to be located near the center of gravity, and the operability is favorable because the rotation can be easily made by a small operating force when changing the angle.

According to this embodiment, the frame 18 is provided with guide grooves 26 and 28 along the high and low direction, rollers 32 and 34 provided on the slide plate 30 are caused to be slidably engaged in these guide grooves 26 and 28 so as to enable the hinge 36 (LCD unit 24) to move, and yet the slide plate 30 is coupled to the frame 18 through the X link 38. Therefore, when adjusting the height of the LCD unit 24, the operation becomes smooth to improve the operability. Further, since a height adjustment mechanism is realized in simple structure, the cost is suppressed, and a light-weight and compact specification required for portability can be sufficiently met.

Further, according to this embodiment, the lid 16 is configured by the frame 18 and the cover 20, and the cover 20 can be shifted to a position spaced apart from the frame 18. Therefore, there is no need for new provision of space for moving the slide plate 30, space for operating the X link 38 and the like, but miniaturization and higher density are promoted. Further, its cover 20 is supported by supporting shafts 22A and 23A, which are coaxial to the hinges 22 and 23 for pivotably supporting the frame 18 respectively, whereby the structure to rotate the cover 20 is simplified and increases and the like in weight and cost are suppressed.

According to this embodiment, the cable 64 is guided through between the frame 18 and the cover 20. Even if the cable 64 is bent and becomes deformed along with the movement of the LCD unit 24 by wiring as described above, there is no possibility that the cable 64 is subject to excessive stress and is damaged by rubbing because the cover 20 is spaced apart from the frame 18 to form a gap 92.

Further, in the X link 38, a cable proximal end side 64A and a cable tip end side 64B are disposed respectively in the vicinity of the lower end portion 40A of the link 40 and the upper end portion 41B of the link 41, in which relative movement between end portions is limited only to the high and low direction. This reduces an amount of movement and an amount of deformation of the cable 64 to improve the durability.

Since there is no need for any provision of space for not preventing deformation of the cable 64 within the lid 16 even here, it is preferable for miniaturization.

In the foregoing, the description has been made of the present invention based on the embodiments, but the gist of the present invention is not limited to the range of the embodiments, but should be judged based on the description of the Claims.

The portable computer according to the present invention is desirable for having a computer which allows a user to readily adjust height and angle of the display without deteriorating the operability of the keyboard even when a place, where the portable computer is installed, is restricted in the rear space or the upper space, and also since the operability when the display's height is adjusted will be improved to the benefit of the user.

What is claimed is:

1. A portable computer comprising:
   a body having a keyboard thereon;
   a lid for covering said keyboard, said lid being pivotably connected to a back end of said body;
   a display being disposed in said lid;
   a hinge portion enabling said display to pivot around a first perpendicular line crossing perpendicularly with a high and low direction of said display at an almost middle position of said display, said hinge portion being mounted at the almost middle position of said display; and
   a movable part enabling said hinge portion to move in said high and low direction and to be positioned at a higher position than a top of said lid when said lid is opened, said movable part being disposed between said lid and said display.

2. The portable computer according to claim 1, wherein said movable part includes a guide groove formed in said lid side along said high and low direction, a movable member having said hinge portion and being movable therewith, and a slide portion, being attached to said movable member, slidably engaged into said guide groove.

3. The portable computer according to claim 1, wherein said portable computer has a link part for coupling said movable member to said lid, and said link part is configured such that said link part has two links with an almost same length, which are pivotably coupled to each other at their almost middle portion and intersect; that each of first end portions of said two links is coupled to said lid at a predetermined interval respectively in a second perpendicular line crossing perpendicularly with said high and low direction; that each of second end portions of said two links is coupled to said movable member respectively in a third perpendicular line crossing perpendicularly with said high and low direction; and that at least any one of said first end portions and said second end portions respectively, disposed on a same side in lateral widthwise directions with respect to said high and low direction is made slidable in directions including directions along said first perpendicular line and said second perpendicular line.

4. The portable computer according to claim 2, wherein said lid includes an internal frame member, which constitutes an interior shell of said lid, is supported by a back end of said body, and has said guide groove, and a cover member, which is disposed on an outer surface side of said internal frame member, and is made shiftable between a covering position where said cover member covers said outer surface in almost tight contact with said outer surface, and a spaced-apart position whereat said cover member is spaced apart from said outer surface.

5. The portable computer according to claim 4, wherein said cover member is supported in coaxial with an open-close driving axis of said internal frame member and is made pivotable relative to said internal frame member.

6. The portable computer according to claim 4, wherein said portable computer has a cable member for electrically connecting said body to said display, and said cable member is guided through between said internal frame member and said cover member.

* * * * *